US006927904B2

(12) United States Patent
Kanao (10) Patent No.: US 6,927,904 B2
(45) Date of Patent: Aug. 9, 2005

(54) MICROSCOPE

(75) Inventor: Masato Kanao, Hachioji (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 11/018,004

(22) Filed: Dec. 21, 2004

(65) Prior Publication Data

US 2005/0099681 A1 May 12, 2005

Related U.S. Application Data

(62) Division of application No. 10/741,725, filed on Dec. 18, 2003, now Pat. No. 6,853,483, which is a division of application No. 10/201,067, filed on Jul. 22, 2002, now Pat. No. 6,690,510.

(30) Foreign Application Priority Data

Jul. 24, 2001 (JP) ...................................... 2001-223480

(51) Int. Cl.[7] .............................................. G02B 21/26
(52) U.S. Cl. ...................... 359/393; 359/363; 359/380
(58) Field of Search ................................ 359/363, 368, 359/379, 380, 389, 391, 392, 393; 348/79; 356/237.2, 237.3, 237.4, 237.5

(56) References Cited

U.S. PATENT DOCUMENTS 4,770,520 A    9/1988  Hoogesteger
5,235,459 A    8/1993  Meyer et al.
5,497,267 A  * 3/1996  Ishikawa et al. ............ 359/390
5,570,228 A   10/1996  Greenberg
5,777,783 A    7/1998  Endou et al.
5,818,637 A  * 10/1998  Hoover et al. .............. 359/381
6,452,625 B1   9/2002  Kapitza
6,594,075 B1   7/2003  Kanao et al.
2003/0137724 A1  7/2003  Tonooka
2004/0001253 A1  1/2004  Abe et al.
2004/0114219 A1 * 6/2004  Richardson ................. 359/368

FOREIGN PATENT DOCUMENTS

JP   10-333055 A   12/1998
JP   2000-83184 A   3/2000

* cited by examiner

Primary Examiner—Mark A. Robinson (74) Attorney, Agent, or Firm—Frishauf, Holtz, Goodman & Chick, P.C.

(57) ABSTRACT

In a microscope, an optical system that includes a zoom lens unit having a straight optical axis is located under a stage portion that carries a sample A thereon. An optical image of the sample A is projected on an image-pickup element via the optical system, and is converted into a picture signal by means of the image-pickup element. The picture signal is delivered to the outside through an external terminal area.

4 Claims, 10 Drawing Sheets

MICROSCOPE

CROSS-REFERENCE TO RELATED APPLICATIONS

The present application is a Divisional of U.S. application Ser. No. 10/741,725 filed Dec. 18, 2003, now U.S. Pat. No. 6,853,483, which is a Divisional of U.S. Ser. No. 10/201,067 filed Jul. 22, 2002, now U.S. Pat. No. 6,690,510, which is based upon and claims the benefit of priority from the prior Japanese Patent Application No. 2001-223480, filed Jul. 24, 2001, the entire contents of which are incorporated herein by reference.

BACKGROUND OF THE INVENTION

1. Field of the Invention

The present invention relates to a microscope, and more particularly, to a microscope for converting an observed image of a specimen, such as cellular tissue or a microorganism, into a picture signal to be observed.

2. Description of the Related Art

Computers are utilized in the field of education nowadays. Computerized education is expected to cover various courses of study that utilize actual computers, as well as simple computer training.

In science education, for example, cellular tissue, microorganisms, etc. are directly observed with use of microscopes, and besides, their observed images are supposed to be converted into picture signals, which are to be observed on computers.

A conventional microscope that can generate those picture signals is described in Jpn. Pat. Appln. KOKAI Publication No. Publication No. 10-333055. In this microscope, a lens unit is located next to a specimen stage portion, and a CCD unit is situated on a bent optical path that extends from the lens unit. In acquiring a picture signal, a specimen or sample is placed on the specimen stage portion, and the stage portion is rotated to adjust the focus. Thereafter, an optical image of the specimen is formed by means of the lens unit. The optical image formed in this manner is guided through the bent optical path to a CCD image-pickup element of the CCD unit and converted into electric information, whereupon a picture signal is generated.

In the microscope described above, however, the optical image that is fetched by means of the lens unit is guided to the CCD image-pickup element through the bent optical path. Therefore, the microscope requires use of a lot of essential optical parts, so that its construction is complicated and its optical performance is not very high.

According to this conventional microscope, moreover, the focus is adjusted by rotating the specimen stage portion, so that the direction and position of the specimen on the stage portion inevitably shifts during the focus adjustment. Accordingly, its imaging range or picture frame is unstable, so that the microscope is not easy to handle. It is very hard for this microscope, in particular, to acquire picture data of specimens or sample that have directional shapes, among other specimens or sample including cellular tissue and microorganisms that are observed in educational scenes.

As described above, the conventional microscope has a slim optical structure such that the optical image is guided to the CCD image-pickup element through the bent optical path. Thus, the optical path is so complicated that the optical performance of the microscope is poor.

BRIEF SUMMARY OF THE INVENTION

According to an aspect of the invention, there is provided a microscope for observing a sample to output an electrical image information relating to an image of the sample, comprising:

a stage portion configured to permit the sample to be mounted;

an image-pickup element, on which an optical image of the sample is formed, configure to convert the optical image into the electric image information, an optical system, having the optical axis extending in a straight line between the stage portion and the image-pickup element, configured to guide the optical image of the sample to the image-pickup element;

a light source unit including one light source configured to emit an illumination-light beam for illuminating the sample and a mechanism configured to alternatively locate the light source in any of first, second, and third irradiative positions for transmissive illumination, incident illumination, and oblique illumination, thereby selecting one of the transmissive illumination, incident illumination, and oblique illumination.

According to an another aspect of the invention, there is provided a microscope for observing a sample to output an electrical image information relating to an image of the sample, comprising:

a stage portion configured to permit the sample to be mounted;

an image-pickup element, on which an optical image of the sample is formed, configured to convert the optical image into the electric image information, an optical system, having the optical axis extending in a straight line between the stage portion and the image-pickup element, configured to guide the optical image of the sample to the image-pickup element;

an optical lens barrel portion, the image-pickup element and the optical system being arranged the optical lens barrel portion; and a stage moving mechanism configured to support the stage portion on the optical lens barrel portion and move the stage within a plane substantially perpendicular to the optical axis.

According to an another aspect of the invention, there is provided a microscope for observing a sample to output an electrical image information relating to an image of the sample, comprising:

a stage portion configured to permit the sample to be mounted;

an optical system, located under the stage portion and including a zoom lens unit, configured to form the optical image of the sample;

an image-pickup element, which is arranged in the image forming position of the optical system for the sample and on which the optical image is formed, configured to convert the optical image into the electric image information, an external output portion configured to convert the electric image information generated from the image-pickup element into a picture signal and delivering the signal to the outside of the microscope;

a base portion configured to hold the image-pickup element and the external output portion;

a support structure configured to support the stage portion on the base portion and also support the optical system;

a zoom control portion, located between the base portion and the stage portion, configured to move the zoom lens unit along the optical axis; and a focus adjusting mechanism, supported under the stage portion by means of the support structure, configured to focus the optical system on the sample.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A microscope according to an embodiment of the present invention will now be described in detail with reference to the accompanying drawings.

Figure 1:
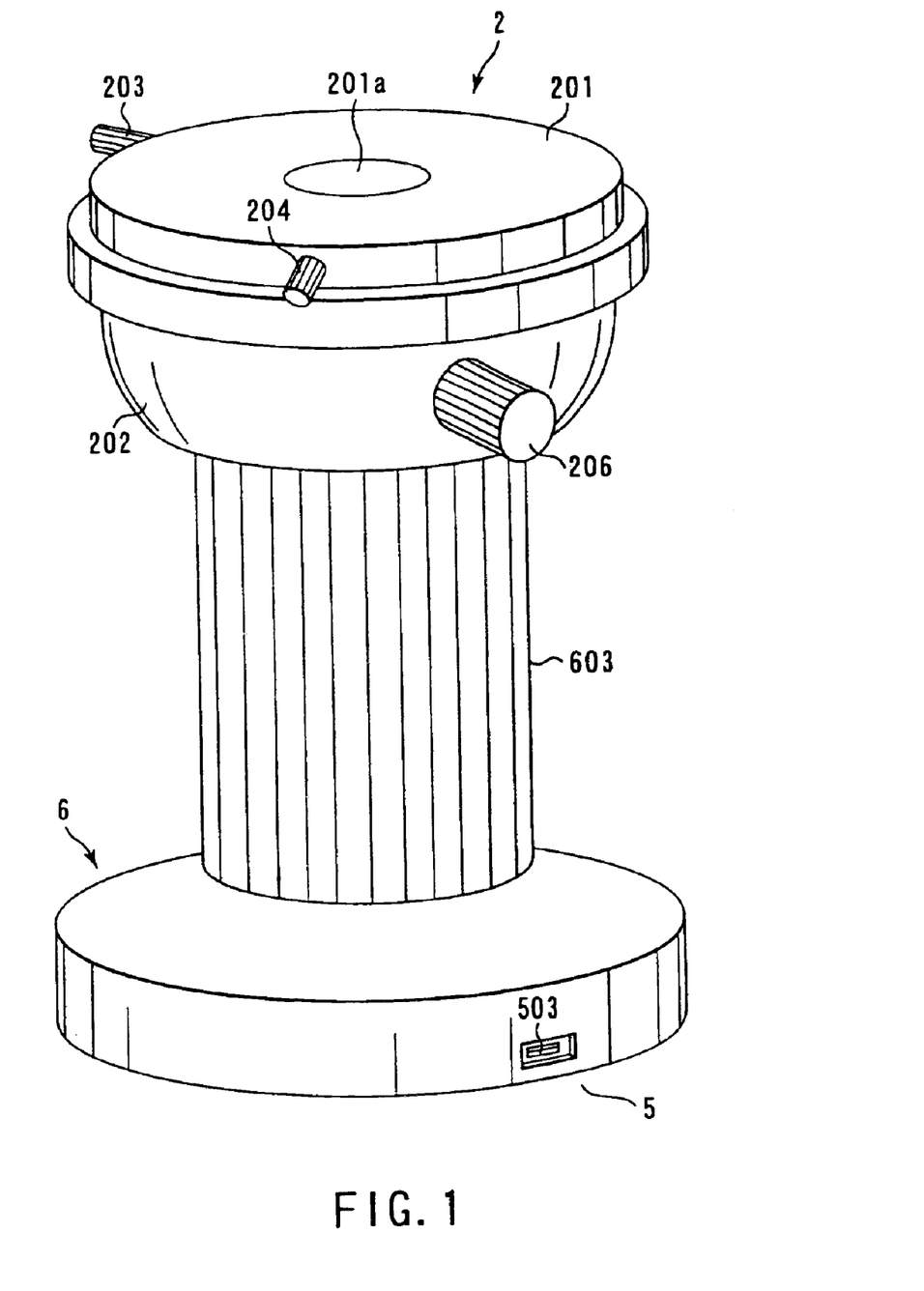
FIG. 1 is a perspective view schematically showing the external appearance of a microscope according to an embodiment of the invention.
Figure 2:
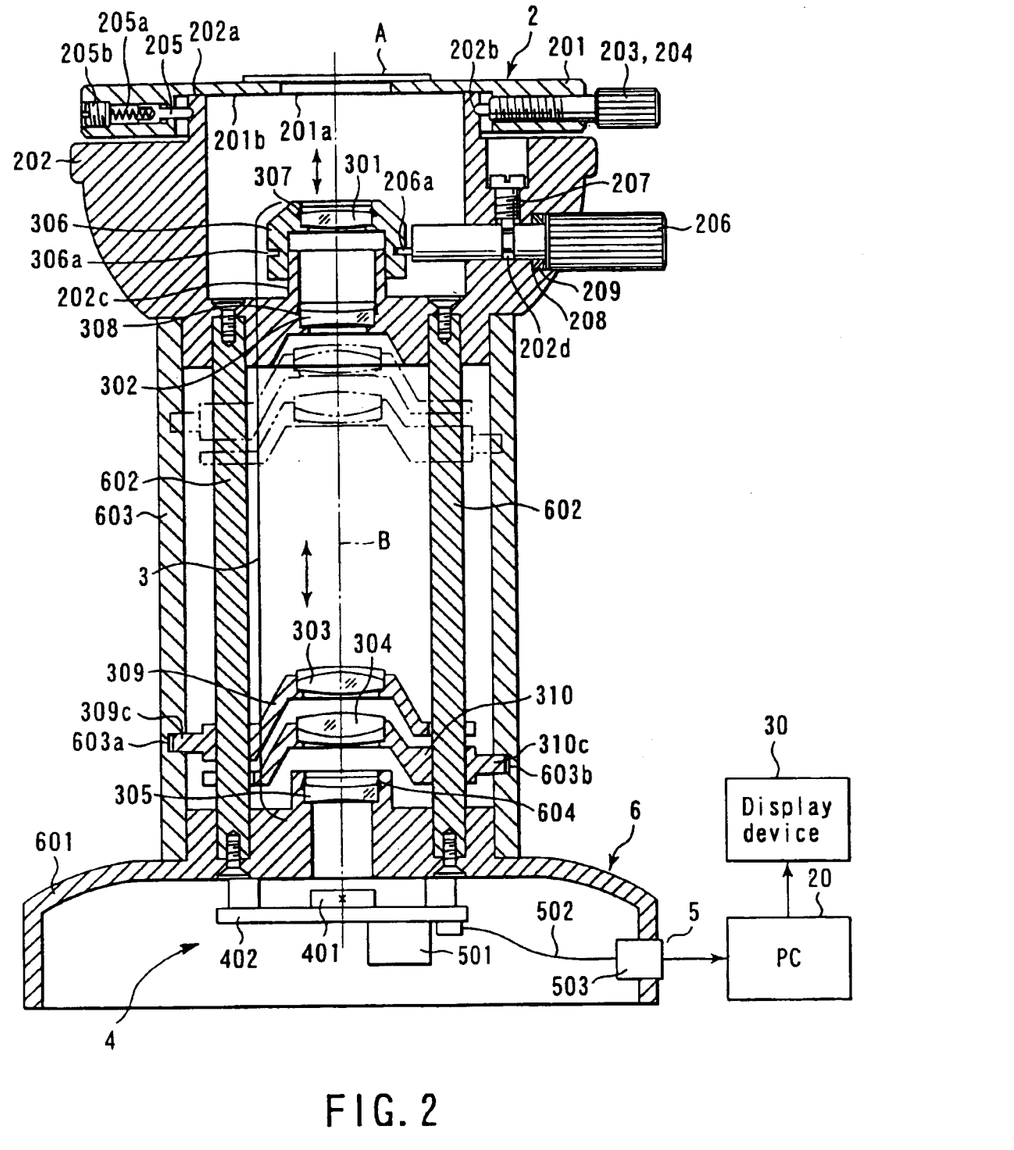
FIG. 2 is a schematic sectional view taken along the optical axis of the microscope of FIG. 1.

FIGS. 1 and 2 show the microscope according to the embodiment of the invention. FIG. 1 shows the external appearance of the microscope, and FIG. 2 shows a profile along the optical axis of the microscope.

As shown in FIG. 1, the microscope is in the form of a cylinder having a base portion 6 at the bottom and a stage portion 2 at the top. For example, the microscope is 187 mm high, and the base portion has an outside diameter of 124 to 150 mm.

As shown in FIG. 2, the microscope comprises the stage portion 2 that carries a sample A thereon, a zoom lens unit 3 as an optical system capable of focusing and changing the magnification of an optical image of the sample A on the stage portion 2, and an image-pickup portion 4 that includes an image-pickup element for detecting the optical image enlarged by means of the zoom lens unit 3. All these portions are mounted on the base portion 6 so as to their respective optical axes are substantially on a straight line. The optical image is applied the image-pickup portion 4 through the zoom lens unit 3 and the image-pickup portion 4 converts the input optical image into electric image information and processes it to generate a picture signal. This picture signal is externally delivered to an external apparatus, such as a personal computer 20, through an external terminal unit 5 such as a universal serial bus, which is so called USB. Thereupon, a picture of an object of observation is displayed on a display device 30 which is connected to the personal computer 20.

Figure 3:
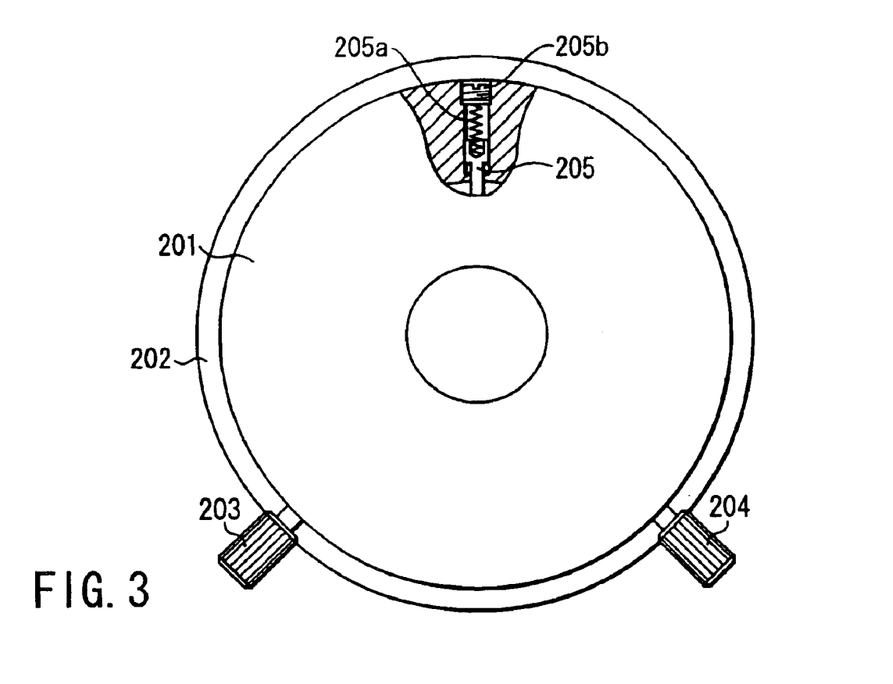
FIG. 3 is a cutaway plan view schematically showing a part of a stage plate in order to illustrate the construction of the stage plate.

The stage portion 2 is provided with a stage plate 201 that has an opening 201a near its optical axis. As shown in FIG. 3, a pair of control knobs 203 and 204 are screwed into the outer peripheral surface of the stage plate 201 for sliding motion in a direction substantially perpendicular to the optical axis. They are spaced at about 90° in respect to the optical axis of the microscope. A plunger 205 is opposed to the control knobs 203 and 204 so as to be slidable in the same direction. The plunger 205 is pressed in a direction perpendicular to the optical axis by means of a spring 205a and a stopper screw 205b.

The control knobs 203 and 204 and the plunger 205 have spherical or rounded distal ends, respectively. A stage support base 202 is provided with a ring section having an outer peripheral surface on which recesses 202b are formed. Each of the recesses 202b has a inclined face for receiving a corresponding one of the distal ends of the control knobs 203 and 204 and the plunger 205. The spherical distal ends of the control knobs 203 and 204 and the plunger 205 are contacted to the face of the recesses 202b formed on the outer peripheral surface of the stage support base 202. Each of the recesses 202b is formed as a circular corn space and has a part of the face inclined to the specimen or sample A and extended as to face the specimen or sample A. As the distal ends of the control knobs 203 and 204 is pressed to the inclined face of the recess 202b, a pressing force is produced between the faces and the distal ends of the control knobs 203 and 204 and the pressing force is applied to the control knobs 203 and 204 in a direction away from the specimen A.

Thus, the pressing force is applied to not only the control knobs 203 and 204 but also the stage plate 201 in the direction of the stage support base 202, i.e., in the direction away from the specimen A. Accordingly, a lower surface 201b of the stage plate 201 is pressed against an upper surface 202a of the stage support base 202, whereby the stage plate 201 can be mounted on the stage support base 202 without play. When the control knobs 203 and 204 are rotated, so-called framing is executed such that they control the stage plate 201 for an orthogonal movement in the horizontal direction and a rotational movement in conjunction with the plunger 205, thereby setting the stage plate 201 in a desired position on the stage support base 202.

The stage support base 202 may have an inclined outer peripheral surface, instead of the recess 202b formed on the outer peripheral surface of a stage support base 202. The respective distal ends of the control knobs 203 and 204 and the plunger 205 are so contacted and engaged on the inclined outer peripheral surface as to apply a contact pressure to the inclined outer peripheral surface in a direction away from the stage plate 201 and urge the stage plate 201 to be contacted on the stage support base 202.

The zoom lens unit 3 includes first, second, third, fourth, lenses 301, 302, 303, 304 and 305, which are arranged so that their optical axis B extends in a straight line. The first lens 301 is formed of an auxiliary lens called a conversion lens, and is fixed to a lens frame 306 by means of a ring spring 307. The lens frame 306 is slidably fitted in a fitting portion 202c that is situated near the optical axis of the stage support base 202.

Further, a groove 306a is formed on the outer periphery of the lens frame 306. An eccentric pin 206a of a focusing handle 206 that is rotatably attached to a side hole 202d of the stage support base 202 is fitted in the groove 306a.

In addition, the eccentric pin 206a is eccentrically positioned from the rotating center of the focusing handle 206. A stopper pin fixed in the support base 202 is engaged with the focusing handle 206 so that the handle 206 is prevented from being dropped out from the support base. Thus, the handle 206 is rotatably held in the support base 202 by means of a spring washer 208 and washer 209 which apply a moderate force to the handle 206.

As the handle 206 is so operated as to rotate, the eccentric pin 206a is rotated around the center of the handle 206 with a radius of the eccentric distance between the centers of the handle and the eccentric pin 206a. Accordingly, the first lens 301 can be moved in the direction of its optical axis to bring the sample A into focus.

Figures 4A, 4B:
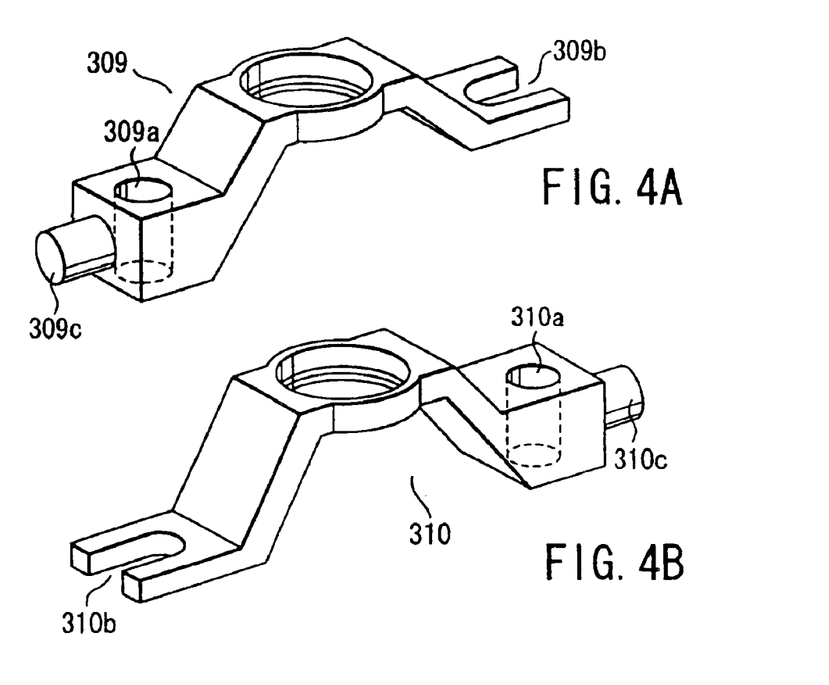
FIGS. 4A and 4B are perspective views schematically showing lens frames of a zoom lens unit shown in FIG. 1.

The second lens 302 is fixed in the fitting portion 202c of the stage support base 202 by means of the ring spring 308. The third lens 303 is fixedly bonded o a lens frame 309 that has a fitting hole 309a and a fitting slit 309b shown in FIG. 4A. The fitting hole 309a and the fitting slit 309b of the lens frame 309 are fitted individually on two support posts 602 for use as support members for axial movement along the optical axis. Further, the fourth lens 304 is fixedly bonded on a lens frame 310 that has a fitting hole 310a and a fitting slit 310b shown in FIG. 4B. The fitting hole 310a and the fitting slit 310b of the lens frame 310, like those of the lens frame 309, are fitted individually on the two support posts 602 for axial movement along the optical axis.

Figure 5:
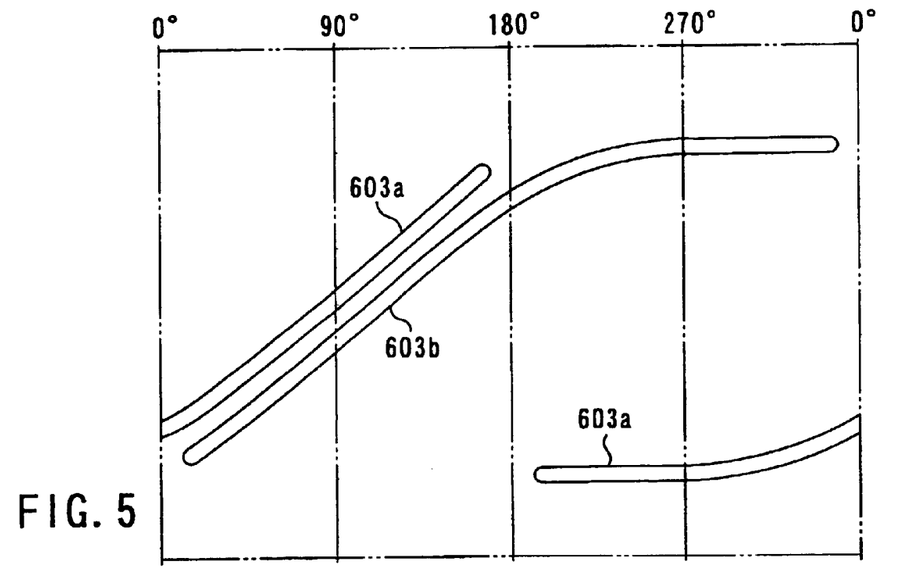
FIG. 5 is a development showing cam grooves formed on a turn ring in order to urge the lens frames shown in FIGS. 4A and 4B to move in the direction of the optical axis.

The two support posts 602 are fixed in a manner such that they are arranged between the stage support base 202 and a base 601 of the base portion 6. The support posts 602 are surrounded by a turn ring 603 that has cam grooves 603a and 603b in its inner wall, as shown in FIG. 5 as described later. As shown in FIG. 2, the upper and lower end faces of the turn ring 603 is held between the stage support base 202 and the base 601 with narrow gaps between them. The top and bottom portions of the turn ring 603 are rotatably fitted on cylindrical protrusions of the stage support base 202 and the base 601, respectively.

A cam follower 309c on the lens frame 309 and a cam follower 310c on the lens frame 310 are fitted in the cam grooves 603a and 603b of the turn ring 603, respectively. As shown in the development of FIG. 5, for example, the cam grooves 603a and 603b are formed having a desired shape such that the image of the sample A can be enlarged and reduced in size by means of the third and fourth lenses 303 and 304 as it is formed on the respective focal points of the lenses.

Thus, when the turn ring 603 is so operated as to rotate, the cam followers 309c and 310c are guided on the cam grooves 603a and 603b, respectively, to move the third an fourth lenses 303 and 304 (indicated by two-dot chain lines in FIG. 2), thereby enlarging and reducing the optical image of the sample A.

The fifth lens 305 is fixedly fitted in the base 601 by means of a ring spring 604.

Further, the image-pickup portion 4 includes an image-pickup element 401, which receives the optical image of the sample A enlarged by means of the zoom lens unit 3 and converts it into electric information, and a circuit board 402 for holding the image-pickup element 401. The circuit board 402 is fixed on the base 601 of the base portion 6 in a manner such that the image-sensing surface of the image-pickup element 401 that is formed integrally with the board 402 is in line with the optical focal point (image forming point) of the zoom lens unit 3.

Furthermore, the external terminal area 5 includes a processor 501 formed integrally on the circuit board 402 and a terminal 503 such as a USB to be connected with the personal computer 20. The processor 501 processes the electric information from the image-pickup element 401 and converts it into a picture signal that can be outputted externally. The processor 501 and the terminal 503 are connected electrically to each other by means of a lead wire 502, and are configured to be able to output the picture signal externally or be supplied with power from the personal computer. Thus, the image-pickup portion 4 is supplied with power from the personal computer that is connected to the external terminal area 5 as its drive is controlled. In consequence, the number of parts used in the microscope can be reduced, so that the microscope can be simplified in construction and reduced in size.

In observing the sample A in this arrangement, the personal computer is first connected to the external terminal area 5. If this is done, the image-pickup portion 4 is supplied with power from the personal computer, and the turn ring 603 is operated to rotate. Thereupon, the cam followers 309c and 310c of the lens frames 309 and 310 of the third and fourth lenses 303 and 304 are guided by the grooves 603a and 603b of the turn ring 603, as mentioned before, so that the movement of the zoom lens unit 3 in the direction of the optical axis is adjusted, and the magnification of the formed optical image is settled.

As this is done, the control knobs 203 and 204 are rotated to adjust the movement of the stage plate 201 and frame the sample A in a desired position. At the same time, the rotation of the focusing handle 206 is adjusted to regulate the movement of the first lens 301 in the direction of the optical axis, thereby bringing the sample A into focus.

The optical image of the sample A placed on the stage plate 201 is enlarged by means of the zoom lens unit 3, and is formed and converted into electric information by means of the image-pickup element 401 of the image-pickup portion 4. The electric information is processed to generate a picture signal. This picture signal is delivered to the personal computer 20 through the external terminal area 5. As this is done, the image-pickup portion 4 is supplied with power from the personal computer through the external terminal area 5, as mentioned before, whereby its operation is controlled.

According to this arrangement, the image-pickup element 401 is opposed straight to the underside of the stage portion 2 across the zoom lens unit 3 that has a straight optical axis. The picture signal is generated from the electric information converted by means of the image-pickup element 401 and outputted externally. Accordingly, the optical path is simplified, and miniaturization and simplification of construction can be realized without failing to maintain high-efficiency optical performance. Thus, the ease of handling of the microscope, including its portability, can be improved. According to this arrangement, moreover, a picture signal for an optical image with a seamless magnification can be acquired with ease.

Figure 6:
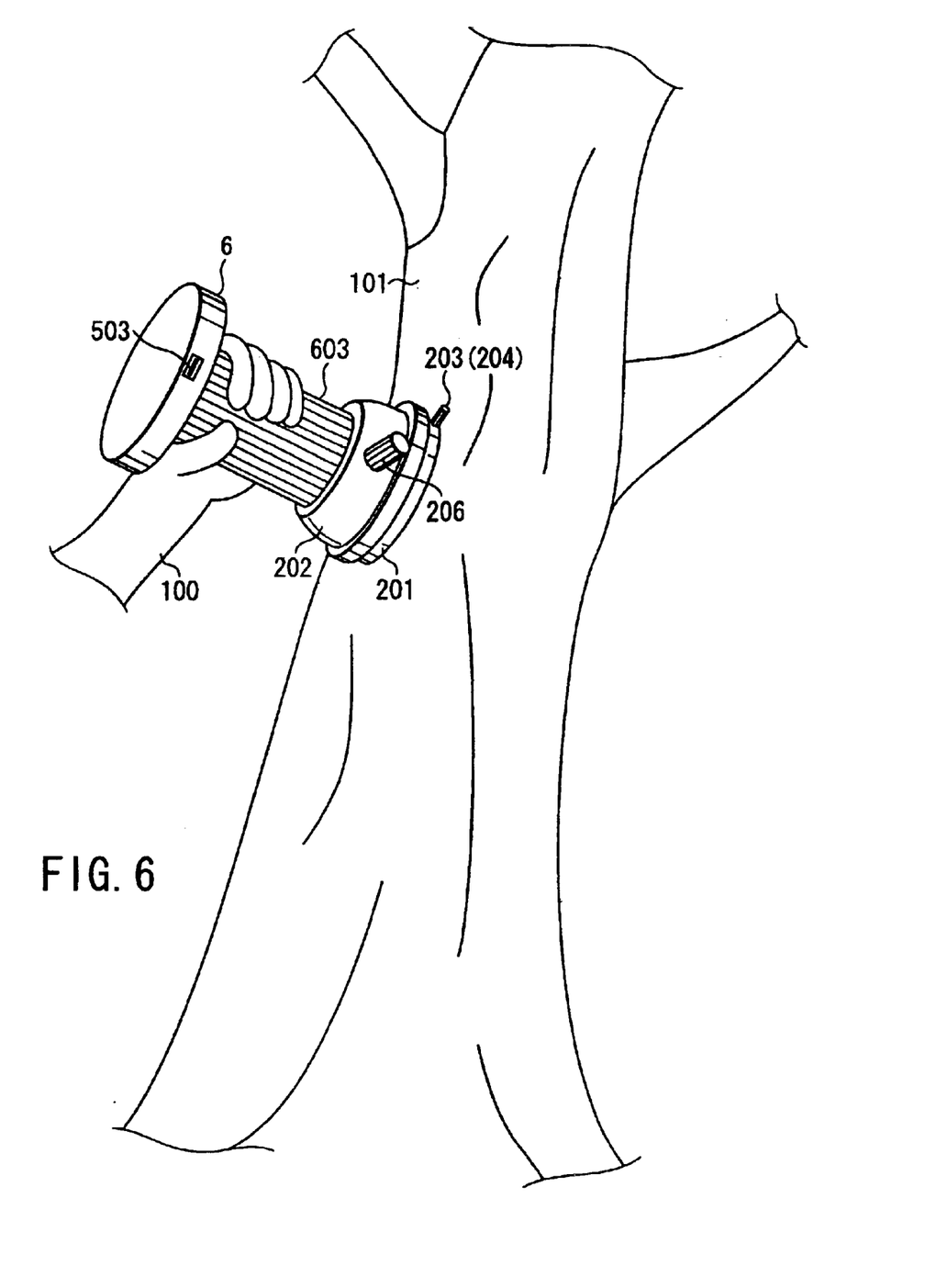
FIG. 6 is a perspective view schematically showing a mode of use of the microscope shown in FIG. 1.

According to this arrangement, furthermore, the microscope is the so-called inverted microscope in which the zoom lens unit 3 is located on the backside of the stage plate 201 of the stage portion 2 on top of which the sample A is placed. Therefore, the sample A to be observed is not limited in size, and may be any substance that can be placed on the stage plate 201 of the stage portion 2. Thus, a wide variety of objects can be observed. As shown in FIG. 6, for example, a user 100 can observe the surface of a bulky object, such as the bark of a tree 100, in a manner such that he/she holds the turn ring 603 and applies the stage plate 201 of the stage portion 2 to the tree.

According to this arrangement, moreover, the sample A can be brought into focus by adjusting the movement of the first lens 301 of the zoom lens unit 3 with the stage plate 201 fixed. Thus, high-accuracy focus adjustment can be effected by simply rotating the focusing handle 206, and the sample A on the stage plate 201 can be framed by only rotating the control knobs 203 and 204 to adjust the movement of the stage plate 201 on a flat surface.

According to the embodiment described above, furthermore, the first lens 301 of the zoom lens unit 3 is provided as focus adjusting mechanism for movement in the direction of the optical axis. Alternatively, however, the focus adjusting mechanism may be arranged in the manners shown in FIGS. 7 and 8. In FIGS. 1 to 5 and FIGS. 7 and 8, like numerals are used to designate like portions, and a detailed description of those portions is omitted.

Figure 7:
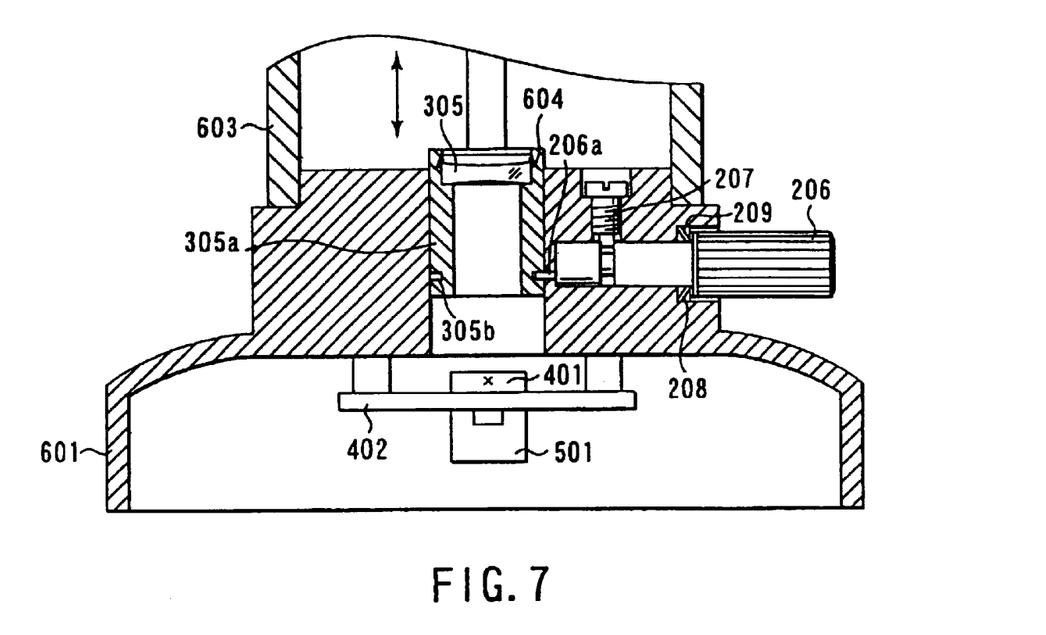
FIG. 7 is a partial sectional view schematically showing a part of a microscope according to another embodiment of the invention.

In the arrangement shown in FIG. 7, the fifth lens 305 is located for movement in the direction of the optical axis with respect to the base 601, and its movement in the direction of the optical axis can be regulated for focus adjustment. More specifically, the fifth lens 305 is attached to a lens frame 305a by means of the ring spring 604, and the lens frame is mounted on the base 601 for movement in the direction of the optical axis. A driven groove 305b is formed around the lens frame 305a, and the eccentric pin 206a on the focusing handle 206 can be inserted into the groove 305b. The handle 206 is rotatably mounted on the base 601 by means of the stopper pin 207, spring washer 208, and washer 209. As the handle 206 is rotated, the lens frame 305a of the fifth lens 305 can be moved in the direction of the optical axis by means of the eccentric pin 206a to adjust the focus of the zoom lens unit 3.

According to this arrangement, the focus can be adjusted near the base portion 6, so that the user 100 can operate the microscope with his/her hand on a desk. Thus, stable adjustment operation can be realized.

Focus adjusting mechanism capable of adjusting the focus by moving the fifth lens 305 in the direction of the optical axis can be combined with the foregoing focus adjusting mechanism that uses the first lens 301. By doing this, the range of focus adjustment can be widened, and the mode of observation can be diversified. If the first and fifth lenses 301 and 305 are differentiated in optical power, in this case, the focusing effect of the first lens 301 compared with its movement can be made different from the focusing effect of the fifth lens 305. Thus, rough- or fine-movement focusing operation can be carried out by operating these lenses separately.

Figure 8:
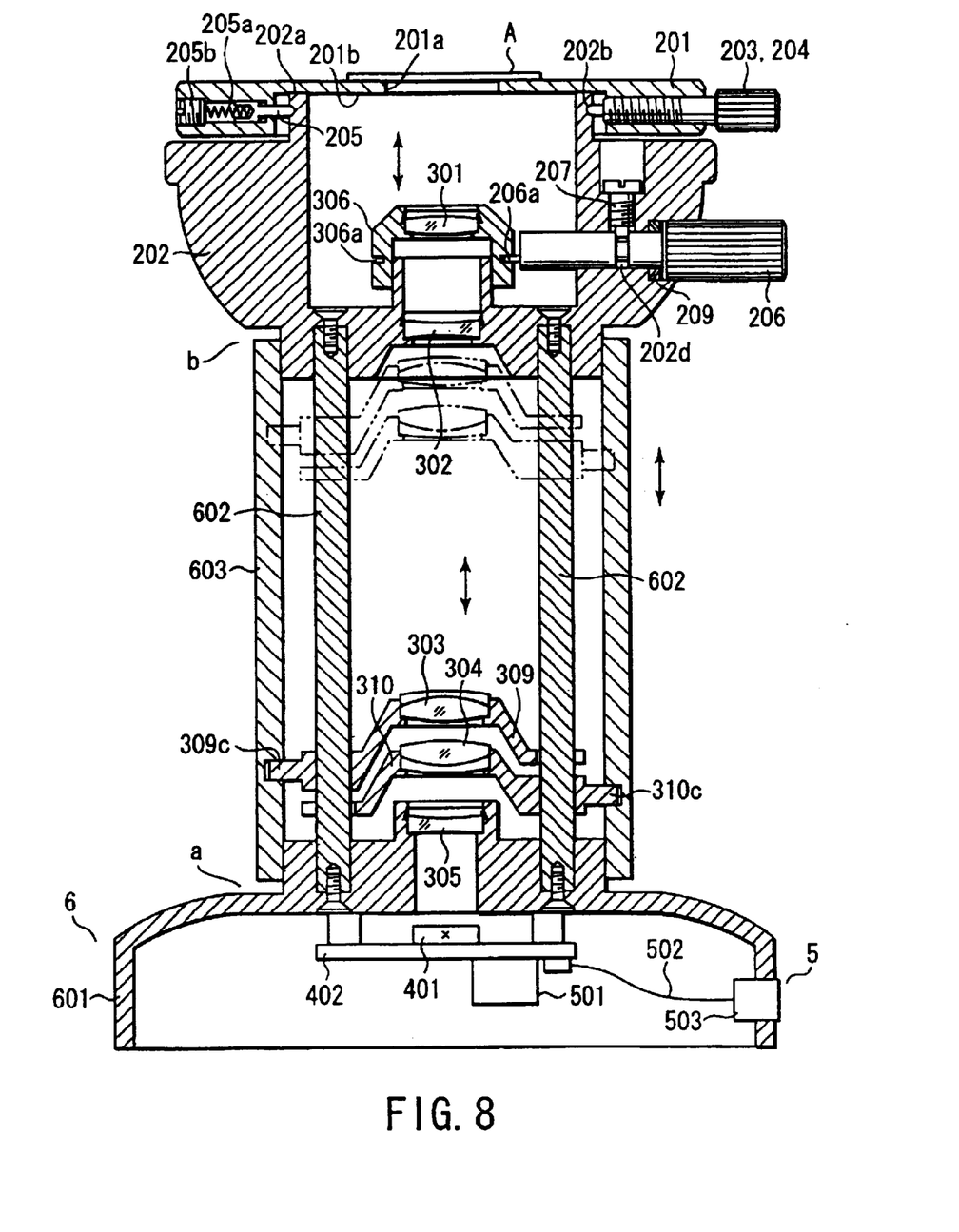
FIG. 8 is a sectional view schematically showing a microscope according to still another embodiment of the invention.

In the arrangement shown in FIG. 8, moreover, the overall length of the turn ring 603 is made shorter than that of each support post 602 so that there are gaps a and b between the ring 603 and the base 601 and between the ring 603 and the stage support base 202, respectively. According to this arrangement, the turn ring 603 doubles as a control portion for the enlargement and reduction of the image of the sample A and as a control portion for bringing the sample A into focus. Accordingly, the operations for focusing and for the enlargement and reduction of the sample image can be carried out by manipulating only one part. Thus, the handling operation can be simplified, and the number of essential parts can be reduced.

According to this embodiment, moreover, the turn ring 603 can be moved in the direction of the optical axis by means of an eccentric pin or any other control means without being directly operated, as in the case of the operation for moving the first lens 301 of the foregoing embodiment. By doing this, defocus during the operation for the enlargement and reduction of the sample image can be reduced, and additional effects can be expected.

The present invention is not limited to the embodiments described above. A light source unit 8 may be provided on the stage base portion 2 shown in FIGS. 9 to 11, which corresponds to the stage base portion 2 shown in FIG. 2. In FIGS. 1 to 5 and FIGS. 9 to 11, like numerals are used to designate like portions, and a detailed description of those portions is omitted.

Figure 9:
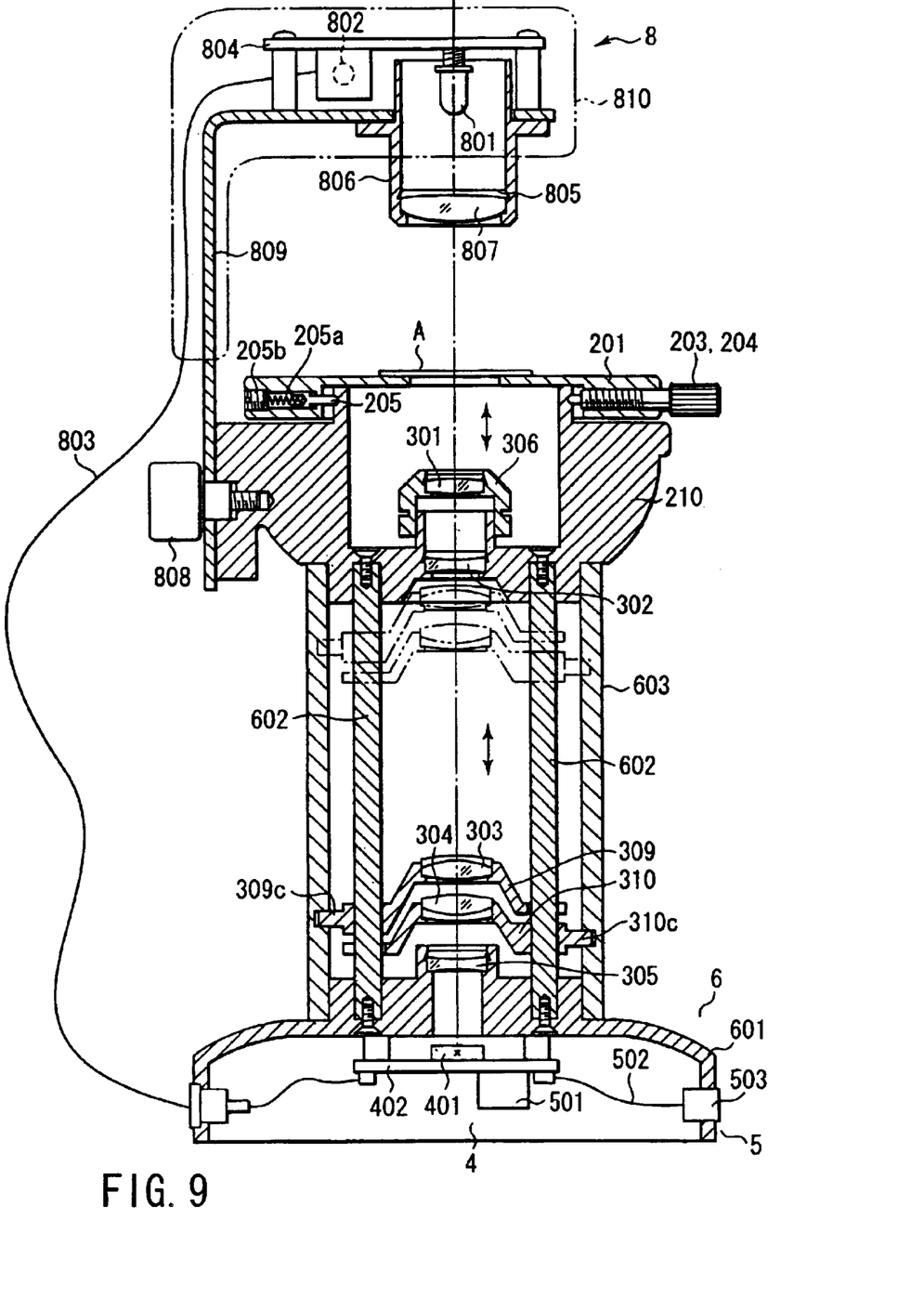
FIG. 9 is a sectional view schematically showing a microscope according to a further embodiment of the invention.

The light source unit 8 includes a light source 801 and a power supply controller 802 such as a variable resistor, for power supply control, which are mounted on a base plate 804. The controller 802 is connected electrically to the image-pickup portion 4 or circuit board 402 by means of a cable 803.

A cylindrical part 806 is located around the light source 801. A condenser lens 807 is attached to the cylindrical part 806 by means of a ring spring 805. The lens 807 is used to focus light from the light source 801 on the sample A that is placed on the stage portion 2. The base plate 804 and the cylindrical part 806 are fixedly supported on one end portion of an arm 809. The other end portion of the arm 809 is attached to a stage support base 210 by means of a fixing knob 808 so that its angle around the axis of the knob 808 is adjustable. The base plate 804 and the cylindrical part 806 that are supported by means of the arm 809 are enveloped in a sheathing cover 810, which is indicated by two-dot chain line in FIG. 9, for example. A part of the cylindrical part 806 projects outside the sheathing cover 810 in order to irradiate the stage plate 201 with the light from the condenser lens 807.

A hole 210a is formed in the side face of the stage support base 210. Illumination light from the light source unit 8 is applied to the sample A through the hole 210a from under the stage plate 201 as the arm 809 is rocked around its axis.

If the personal computer 20 shown in FIG. 2 is connected to the terminal 503 of the external terminal area 5 in this arrangement, electric power that is supplied from the personal computer is supplied to the light source unit 8 through the image-pickup portion 4, whereupon the sample A on the stage plate 201 is illuminated by transmission. As this is done, the supplied power can be adjusted by operating the controller 802, so that an image with steadier brightness and color can be obtained.

If the arm 809 is tilted with the fixing knob 808 loosened, moreover, oblique transmissive illumination can be effected by means of the light source unit 8. Incident illumination or oblique incident illumination through the hole 210a of the stage support base 210 can be realized by adjusting the tilt angle of the light source unit 8 in a manner such that the source unit 8 is tilted so as to face the hole 210a, as indicated by two-dot chain line in FIG. 10, for example.

According to this embodiment, the light source unit 8 can apply steadier illumination light to the sample A, so that a bright, high-resolution image can be obtained, and high-accuracy observation can be facilitated. Further, the observation mode can be switched between transmissive-illumination observation, incident-illumination observation, and oblique-illumination observation by simply rocking the arm 809 around its axis. Thus, various observation methods can be realized with ease. According to this arrangement, furthermore, electric power from the personal computer 20 is supplied to the light source unit 8 through the circuit board 402, so that the number of essential parts can be reduced, and therefore, the microscope can be miniaturized.

Figure 11:
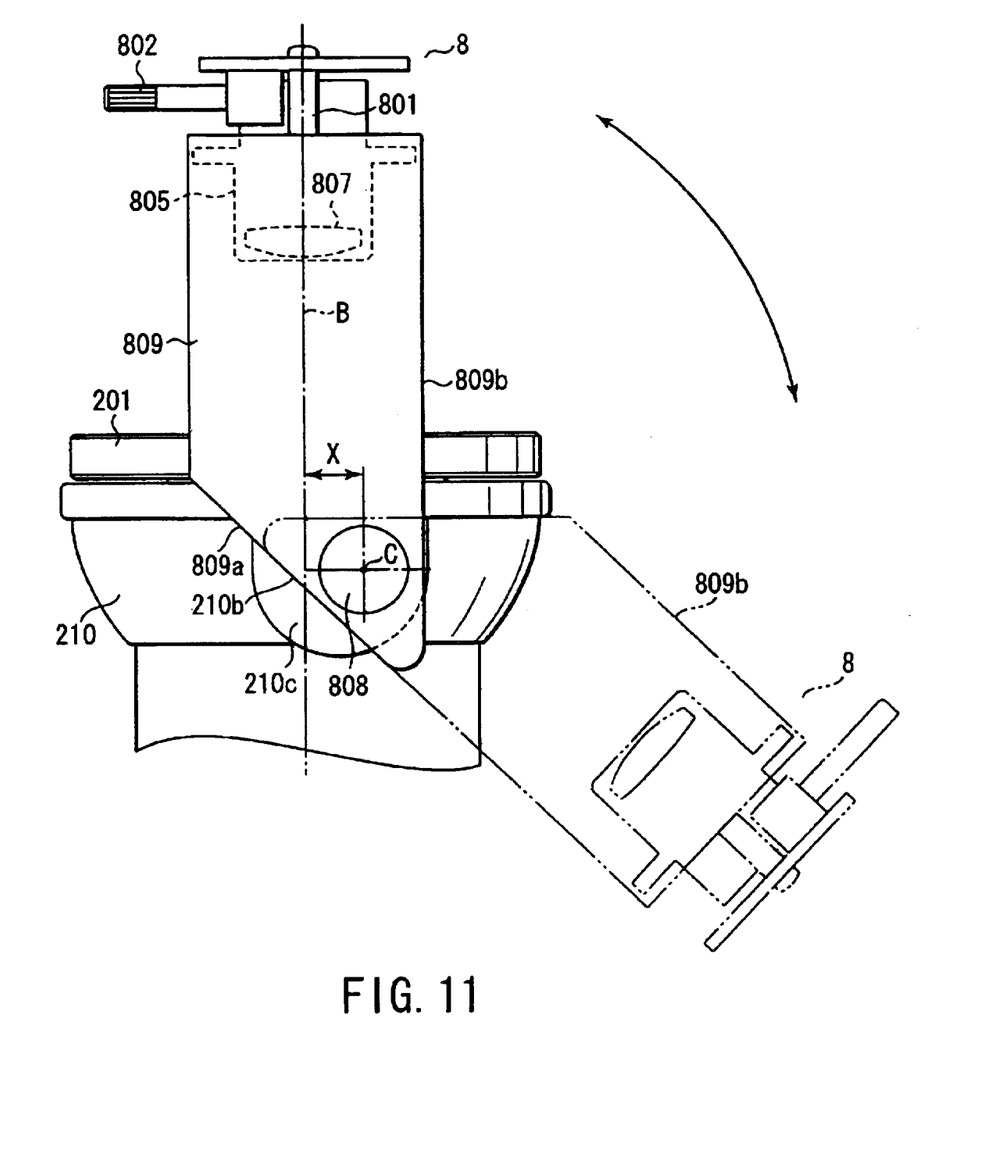
FIG. 11 is an enlarged plan view schematically showing a part of the microscope shown in FIG. 9.
Figure 12:
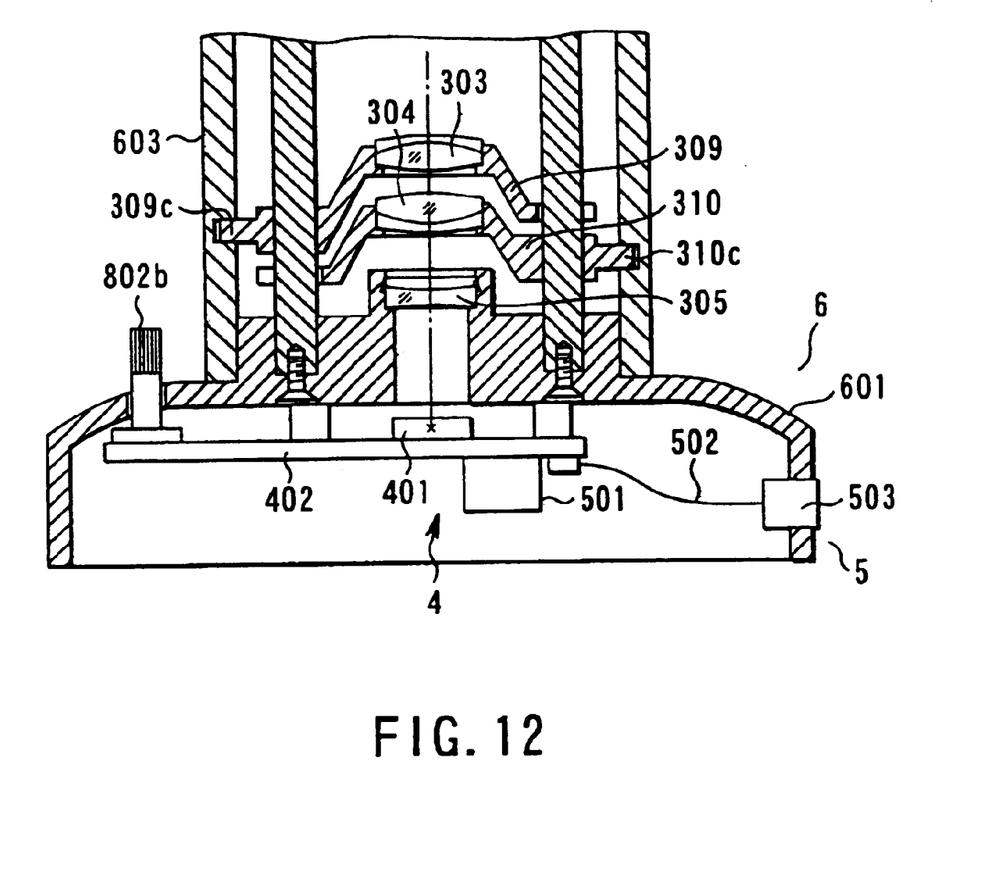
FIG. 12 is a partial sectional view schematically showing a part of a microscope shown in FIG. 9.

The light source unit 8 can be easily adjusted to different illumination modes by attaching the arm 809 to the stage support base 210 in the manner showing 11, for example. More specifically, the stage support base 210 is provided with a protuberance 210c that has an angled reference surface 210b for arm attachment. The arm 809 is provided with two surfaces 809a and 809b that are inclined at given angles, corresponding to the reference surface 210b of the protuberance 210c.

In this arrangement, the light source unit 8 can be accurately located in a predetermined position suited for transmissive illumination by fixing the arm 809 by means of the fixing knob 808 with the surface 809a of the arm 809 held against the reference surface 210b of the protuberance 210c of the stage support base 210. Thus, transmissive illumination is executed (see FIG. 10). Then, the fixing knob 808 is loosened, and the arm 809 is lifted above the protuberance 210c and rotated. In this state, the arm 809 is fixed by means of the fixing knob 808 with the surface 809b held against the reference surface 210b of the protuberance 210c this time. The light source unit 8 is positioned for incident illumination, facing the hole 210a of the stage support base 210, as indicated by two-dot chain line in FIG. 10, and incident illumination is executed.

Thus, illumination in a predetermined position can be easily repeated by using the single light source unit 8. For example, a desired state of illumination, such as a state with the best optical performance or a bright state, can be easily reproduced, so that the ease of handling of the microscope can be improved.

Figure 10:
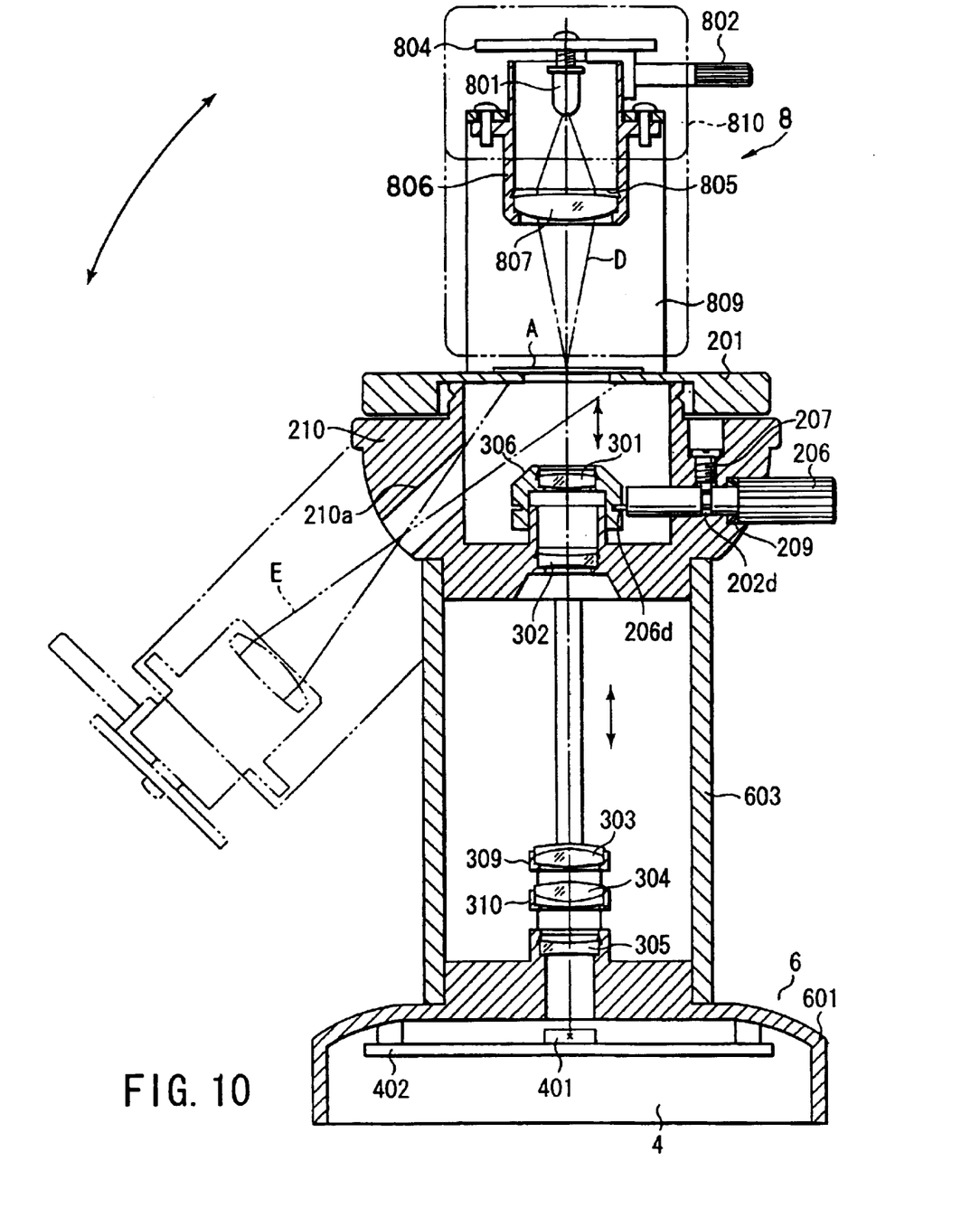
FIG. 10 is a sectional view schematically showing the microscope of FIG. 9 and illustrating the way a lighting system of the microscope is used.

The fixing knob 808 is rotatably mounted on the protuberance 210c of the stage support base 210 with its central axis C or axis of rotation deviated from the optical axis B for a distance X corresponding to the hole 210a. Thus, by only variably setting the distance X of the light source unit 8, ranges of illumination for a light beam D for transmissive observation and a light beam E for incident observation can be set with ease, as shown in FIG. 10, for example.

In each of the embodiments described above, the stage plate 201 that constitutes the stage portion 2 is mounted on the stage support base 202 (210) by means of the control knobs 203 and 204 and the plunger 205 in a manner such that it can move and rotate on a plane substantial perpendicular to the optical axis of. Alternatively, however, the stage portion may be of a so-called grinding-stage structure such that the stage plate 201 is mounted on the stage support base 202 (210) with use of pasty oil, such as grease, for movement and rotation on a plane substantially perpendicular to the optical axis. According to this arrangement, the stage plate 201 can be framed more easily.

In the embodiment described above, the microscope has the configuration wherein the stage plate 201 constituting the stage portion 2 is mounted on the stage support base 202 by means of the control knobs 203, 204 and the plunger 205 in such a manner that the stage plate 201 is controlled to be moved and rotated on the plane perpendicular to the optical axis of the optical system. However, in this invention, it is not limited to that configuration and a modified configuration can be applied to the stage structure. In an example of the modified configuration, the stage portion has a gliding stage structure in which the control knobs 203, 204 and the plunger 205 are removed from the configuration shown in FIG. 2, and a pasty oil such as a grease is applied between the stage plate 201 and the stage base 202 to allow the stage plate to be moved and rotated on the plane perpendicular to the optical axis of the optical system.

This stage configuration can realize a easy to handle the stage plate 201 and a simple operation of the framing with utilizing the stage plate 201.

According to the embodiment described above, moreover, the two support posts 602 are used as support members to couple the stage support base 202 to the base 601. Alternatively, however, three or more support posts 602 may be used to couple the stage support base 202 (210) and the base 601.

According to the embodiment described above, furthermore, the controller 802, i.e., the variable resistor, for controlling and adjusting the electrical power supply is mounted on the light source 801. However, it is not limited that the controller 802 is mounted on the light source. Alternatively, the controller 802 may be mounted on the circuit board 402, which is provided in the base 601 of the base portion 6, and an operating part 802b of the controller 802 is so provided as to project from the base 601 along the turn ring 603. In this arrangement, it is easy to handle the magnification adjustment of the zoom lenses and the light intensity control of operating the power supply adjustment, because the operating part of the controller 802 is located in the vicinity of the turn ring 603.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope comprising:
   a stage portion configured to permit a sample to be contacted;
   support post supporting the stage portion;
   a base portion supporting the support post;
   an image-pickup element arranged at an opposite side of a surface with which the sample on the stage portion is in contact, and configured to convert an optical image of the sample into an electrical signal;
   an optical system, having an optical axis extending in a straight line between the stage portion and the image-pickup element, configured to guide the optical image of the sample to the image-pickup element; and
   a stage moving mechanism configured to support the stage portion on the support post and move the stage within a plane substantially perpendicular to the optical axis.

2. A microscope according to claim 1, wherein the optical system includes a zoom lens unit, and
   the microscope further comprises:
   a lens frame supporting the zoom lens unit on the support post, and
   a lens frame moving mechanism configured to move the lens frame along the optical axis.

3. A microscope according to claim 2, wherein the lens frame moving mechanism comprises a hollow rotating cylinder portion rotatably attached to the base portion and the stage portion, the optical system is received in the rotating cylinder portion, cam grooves in the inner wall of the rotating cylinder portion are fitted with followers on the lens frame, and the lens frame moving mechanism is actuated to move the lens frame along the optical axis as the rotating cylinder portion is rotated.

4. A microscope according to claim 1, wherein the optical system includes a lens for adjusting the focus of the optical system, and which further comprises a fine-movement mechanism configured to finely move the focus adjusting lens in the direction of the optical axis, thereby focusing the optical system on the sample.

* * * * *